March 31, 1964 R. B. FREEMAN 3,127,089

RECORD JACKET

Filed June 7, 1962

INVENTOR.
Robert B. Freeman

BY Townsend and Townsend
attorneys 3,127,089

RECORD JACKET

Robert B. Freeman, San Francisco, Calif., assignor, by mesne assignments, to Center for the Gifted Child Inc., a corporation of California Filed June 7, 1962, Ser. No. 200,826
3 Claims. (Cl. 229—68)

This invention relates to containers for individual phonograph records and more particularly to such containers that can be securely closed.

Conventional record jackets are normally formed as an envelope, with three sides closed and one side open. Because the conventional jacket is open at only one side, insertion of the record therein is often very difficult. Any enlargement of the opening to simplify insertion of the record also renders more likely the inadvertent sliding out and consequent breakage of the record.

Therefore, it is an object of this invention to provide a record jacket that has a large opening to promote easy insertion of the record into the jacket, in which the opening is closeable to prevent the record from inadvertently slipping out of the jacket. This object is accomplished by providing a jacket which is open on two sides and has along the margins of each such side means for securely and releasably joining the two sides.

A further object of this invention is to provide such record jacket which may be inexpensively mass produced. A record jacket with two panels made of foldable cardboard having two edges permanently joined and the other two edges provided with recently developed fastening velvet permits attainment of the foregoing object.

A feature and advantage of the record jacket made in accordance with the present invention is that a substantially dust-free jacket is provided. Along the margins adjacent the opening in the jacket is disposed adhesive material of the type which adhers only to itself. Thus when the record is inserted into the jacket and the margins are pressed together, a substantially dust-free package results.

Another feature and advantage of this invention is that a record jacket is produced which has additional area upon which printed matter may be placed. It is conventional on record jackets to print a description of the audio material contained on the record and the persons rendering the material. Because the amount of space visible to the reader is limited, the producer of the record often must either curtail his description or enclose an additional leaflet with the record in the jacket. Because the present invention has an opening along two sides of the jacket, half of each panel which forms the jacket can be folded back and the inside surface of the panel exposed to view. On such surface can be printed descriptive material in addition to that printed on the outer surfaces as in conventional record jackets.

These objects, features and advantages, as well as others, will be more apparent after referring to the following specification and attached drawings in which.

Figure 1:
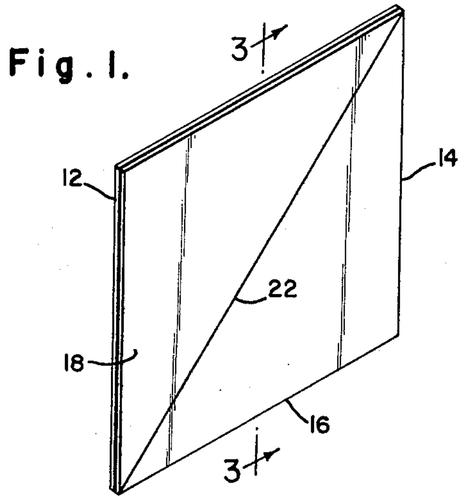
FIG. 1 is a perspective view of the record jacket of the invention in a closed condition.

Referring more particularly to the drawings, reference numeral 12 indicates a foldable panel that is permanently joined along two adjacent edges 14 and 16 thereof to a second foldable panel 18 to form a jacket for a conventional phonograph record R. The joint between panels 12 and 18 along edges 14 and 16 may be formed by gluing two separate panels together or by constructing panels 12 and 18 from a single sheet of material, such as cardboard, and providing a narrow edge wall 20 along edge 14. The edge wall 20 spaces panels 12 and 18 from one another so as to facilitate insertion and removal of record R.

Figure 2:
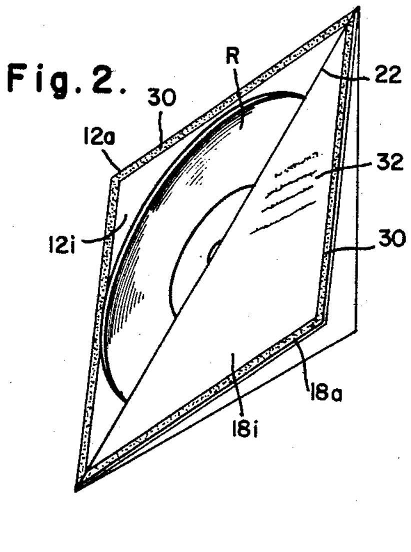
FIG. 2 is a perspective view of the record jacket of the present invention in an open condition.
Figure 3:
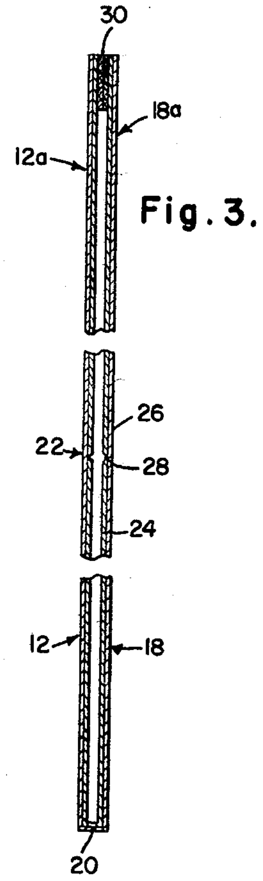
FIG. 3 is a view taken substantially along line 3—3 of FIG. 1.

Each of panels 12 and 18 is provided with a diagonally disposed hinge 22 extending between the free ends of edges 14 and 16. Hinge 22 may be formed by providing a diagonal score line on each panel or by constructing each of the panels 12 and 18 of a ply 24 of relatively rigid material and a ply 26 of relatively flexible material attached exterior of the rigid ply and then slitting rigid ply 24 along a diagonal line, as at 28 in FIG. 3. The hinges thus formed permit the outer half sections **12*a* and 18*a* of panels 12 and 18** to be opened, as more clearly shown in FIG. 2, to afford easy insertion and removal of record R.

Along the interior margins of the outer panel sections **12*a* and 18*a* is attached fastening velvet strips 30. The fastening velvet 30 is preferably of the type described in Patent No. 2,717,437, and adheres to itself but not to any other material. Thus, panel sections 12*a* and 18*a* may be brought together and joined by light pressure around the outside margins thereof to cause engagement of the many individual fibers of the fastening velvet strips 30** and to form a substantially dustproof enclosure for the record R.

On the interior surface **12*i* of panel sector 12*a* and on the interior surface 18*i* of panel sector 18*a* may be placed descriptive material or the like 32 which may describe the content of record R. The printed material 32** is in addition to that contained on the exterior surfaces of the jacket as in the conventional record container.

Thus it may be seen that there has been formed a record jacket which may be readily opened and closed, which permits rapid insertion of the record therein, which forms a substantially dust-free container for the record, and which bears 50% more visible surface area than the conventional record jacket for the placement of printed material describing the record.

While one embodiment of the invention has been shown and described, it will be apparent that other adaptations and modifications may be made without departing from the scope of the invention as defined in the following claims.

What is claimed is:

1. A record jacket comprising first and second rectangular panels joined together along two adjacent edges thereof, at least one of said panels having a diagonal hinge extending between the ends of the joined edges, whereby an opening is formed between the diagonal hinges and the unjoined edges of the panels, and strips of fastening velvet attached continuously around only the interior margins adjacent the unjoined edges for releasably closing the opening.

2. A record jacket comprising first and second rectangular foldable panels joined together along two adjacent edges thereof, each of said panels having a diagonal hinge extending between the ends of the joined edges, said hinges being disposed substantially parallel to one another, whereby an opening is formed between the diagonal hinges and the unjoined edges of the panels, and means for releasably joining the other two adjacent edges of said panels, said joining means being disposed continuously along only the interior margins adjacent the other two edges.

3. A record jacket comprising first and second rectangular panels joined together along two adjacent edges thereof, each of said panels including a ply of relatively rigid material and a ply of relatively flexible material, said ply of rigid material being slit along a diagonal extending between the ends of the joined edges, whereby the ply of flexible material forms a hinge along said slit, and means for releasably joining the other two adjacent edges of said panels, said joining means being disposed continuously along only the interior margins adjacent the other two edges.

References Cited in the file of this patent

UNITED STATES PATENTS

| | | |
|---|---|---|
| 1,440,737 | Jones | Jan. 2, 1923 |
| 2,447,468 | Reyniers | Aug. 17, 1948 |
| 2,850,158 | Woodward | Sept. 2, 1958 |